United States Patent [19]
Eaton et al.

[11] Patent Number: 5,692,697
[45] Date of Patent: Dec. 2, 1997

[54] AUTOMATIC LOCKING RETRACTOR WITH ALIGNMENT STRUCTURE FOR ASSEMBLY

[75] Inventors: Deborah L. Eaton, Rochester Hills; Richard A. Boelstler, Leonard, both of Mich.

[73] Assignee: TRW Vehicle Safety Systems Inc., Lyndhurst, Ohio

[21] Appl. No.: 600,346

[22] Filed: Feb. 9, 1996

[51] Int. Cl.⁶ .................................................. B60R 22/415
[52] U.S. Cl. .................................................. 242/382.2
[58] Field of Search ........................... 242/382.2, 382.4, 242/382.1; 280/806, 807; 297/476, 477, 478

[56] References Cited

U.S. PATENT DOCUMENTS

| | | | |
|---|---|---|---|
| 4,565,338 | 1/1986 | Takada | 242/382.2 |
| 4,597,546 | 7/1986 | Yamamoto et al. | 242/382.2 |
| 4,726,539 | 2/1988 | Schmidt et al. | 242/382.2 |
| 4,809,926 | 3/1989 | Koike | 242/382.2 |
| 5,080,299 | 1/1992 | Gray et al. | 242/382.2 |
| 5,367,917 | 11/1994 | Hishon | 242/382.2 |
| 5,520,349 | 5/1996 | Kapanka et al. | 242/382.2 |

*Primary Examiner*—John M. Jillions
*Attorney, Agent, or Firm*—Tarolli, Sundheim, Covell Tummino & Szabo

[57] ABSTRACT

A seat belt webbing retractor (10) has a spool sleeve (24) about which seat belt webbing (30) is wound. The spool sleeve (24) is rotatable in webbing withdrawal and webbing retraction directions (A and B). A ratchet wheel (26) is fixed for rotation with the spool sleeve (24). A movable pawl (34) has a blocking position for blocking the ratchet wheel (26) and the spool sleeve (24) against rotation in the webbing withdrawal direction (A). The pawl (34) also has a release position for permitting rotation of the ratchet wheel (26) and the spool sleeve (24) in the webbing withdrawal direction (A). A ring gear (96) moves from an initial position to an end position during rotation of the spool sleeve (24) and the ratchet wheel (26) in the webbing withdrawal direction (A). A lever (46) moves from a first position to a second position when the ring gear (96) arrives at the end position to cause movement of the pawl (34) automatically from the release position to the blocking position. An arm (56) on the lever (46) holds the ring gear (96) in a predetermined location relative to the lever during assembly of the retractor.

18 Claims, 3 Drawing Sheets

AUTOMATIC LOCKING RETRACTOR WITH ALIGNMENT STRUCTURE FOR ASSEMBLY

BACKGROUND OF THE INVENTION

The present invention relates to a vehicle seat belt webbing retractor, and more specifically to a webbing retractor having a locking pawl which is moved into engagement with a ratchet wheel to block rotation of a webbing storage spool in a webbing withdrawal direction in response to withdrawal of a predetermined amount of webbing from the spool.

A known retractor has a locking pawl which is moved into engagement with a ratchet wheel to block rotation of a webbing storage spool in a webbing withdrawal direction in response to withdrawal of a predetermined amount of webbing from the spool. The retractor has a ring gear which is rotated during withdrawal of the webbing. Two tabs are formed on the outside of the ring gear. Upon withdrawal of the predetermined amount of the webbing, one of the tabs engages an arm on a mode switching lever to pivot the switching lever in one direction. Pivotal movement of the switching lever in the one direction causes an over-center spring to move a locking pawl into engagement with a ratchet wheel to block rotation of the spool in the webbing withdrawal direction. Upon retraction of substantially the entire length of the webbing back onto the spool, a second arm of the switching lever is engaged by the other tab to pivot the switching lever in a second direction opposite the one direction. The locking pawl is permitted to move out of engagement with the ratchet wheel.

During assembly of the known retractor, the ring gear must be positioned relative to the switching lever such that the pivoting of the switching lever occurs when the proper amount of webbing is withdrawn from the retractor. Once it is properly positioned, the ring gear is held against movement relative to the switching lever. Typically, a fixture of an assembly machine holds the ring gear and the switching lever against movement relative to each other during assembly.

SUMMARY OF THE INVENTION

The present invention comprises a seat belt webbing retractor which has a spool member about which seat belt webbing is wound. The spool member is rotatable in webbing withdrawal and webbing retraction directions. A ratchet wheel is fixed for rotation with the spool member. The retractor includes a movable pawl means which has a blocking position for blocking the ratchet wheel and the spool member against rotation in the webbing withdrawal direction. The pawl means also has a release position for permitting rotation of the ratchet wheel and the spool member in the webbing withdrawal direction.

The retractor includes control means for moving from an initial position to an end position during rotation of the spool member and the ratchet wheel in the webbing withdrawal direction. The retractor also includes lever means for moving from a first position to a second position when the control means arrives at the end position to cause movement of the pawl means from the release position to the blocking position. The retractor includes means for holding the control means in a predetermined position relative to the lever means during assembly of the retractor.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
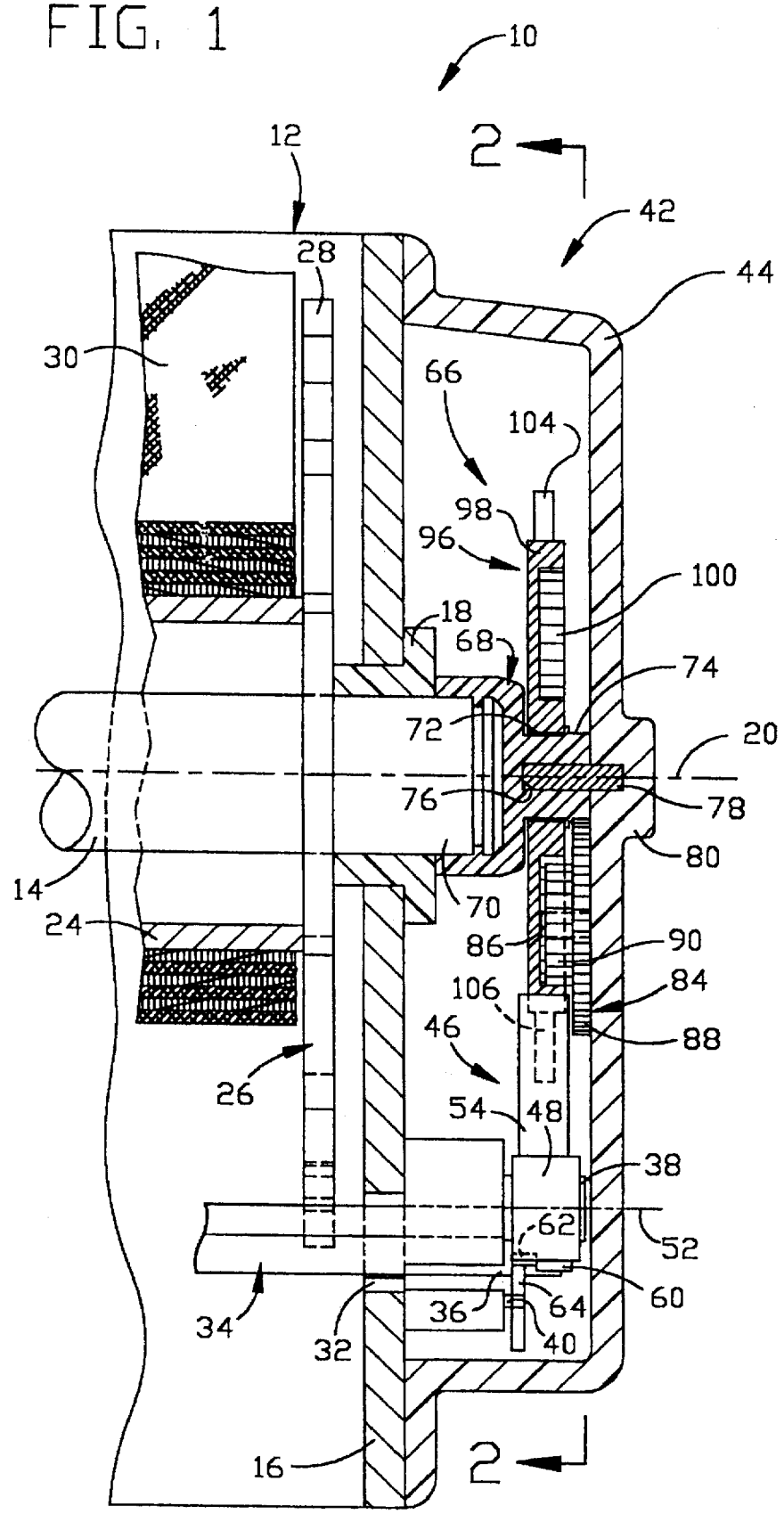
FIG. 1 is a partially broken away, sectional view of a seat belt webbing retractor embodying the present invention.
Figure 2:
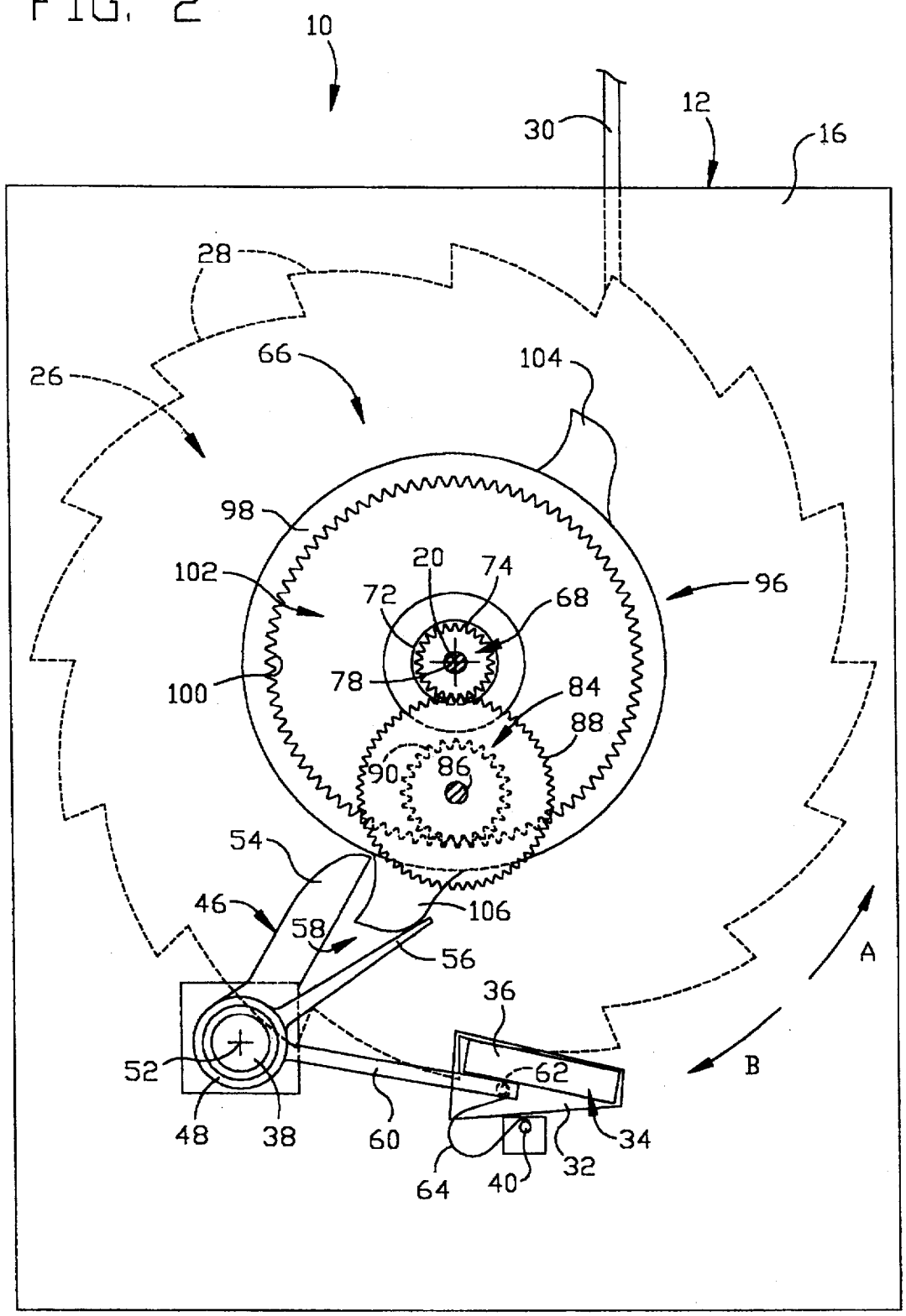
FIG. 2 is a view taken along line 2—2 of FIG. 1 with certain parts removed and showing certain parts in a first operational position.

The present invention relates to a seat belt webbing retractor. The present invention is applicable to various seat belt webbing retractor constructions. As representative of such constructions, a seat belt webbing retractor 10 is illustrated in FIG. 1. The retractor 10 includes a metal frame 12 which is adapted to be mounted in a vehicle (not shown). The frame 12 is generally U-shaped. A metal shaft 14 extends between two sides 16 (only one side is shown in the drawings) of the frame 12. The shaft 14 is supported at each of the two sides 16 by a bushing 18 (only one bushing is shown in the drawings). The bushings 18 are made of a suitable material, such as plastic. The shaft 14 is rotatable relative to the frame 12 about an axis 20 in first and second directions A and B (FIG. 2). These two directions are a webbing withdrawal direction and a webbing retraction direction, respectively.

The retractor 10 has a drive assembly (not shown) for biasing the shaft 14 to rotate in the webbing retraction direction B. The drive assembly may be of any suitable construction and typically includes a housing and a coil spring which extends between the housing and one end of the shaft 14.

A metal spool sleeve 24 (FIG. 1) is concentric about the shaft 14, and has a slot (not shown) which extends parallel to the axis 20 and through the spool sleeve into the interior of the spool sleeve. Two metal ratchet wheels 26 (only one shown) are fixed to the respective axial ends of the spool sleeve 24 by suitable fasteners (not shown). Each ratchet wheel 26 has a plurality of teeth 28 extending in an annular array about the outer radial periphery of the ratchet wheel. Each tooth 28 has a radially extending abutment face and an intersecting sloped face.

Each ratchet wheel 26 has a center opening (not shown). The shaft 14 extends through the center openings of the two ratchet wheels 26, and the ratchet wheels are fixed for rotation with the shaft. Accordingly, the shaft 14, the ratchet wheels 26 and the spool sleeve 24, which is fixed to the ratchet wheels, rotate as a unit about the axis 20.

A length of seat belt webbing 30 is secured at one end to the rotatable unit comprising the spool sleeve 24, the ratchet wheels 26 and the shaft 14. Specifically, the webbing 30 extends through the slot in the spool sleeve 24 and is sewn in a loop (not shown) about the shaft 14. The webbing 30 is wrapped around the spool sleeve 24 in successive layers.

When the webbing 30 is pulled from the spool sleeve 24, the spool sleeve, the ratchet wheels 26 and the shaft 14 rotate in the webbing withdrawal direction A (FIG. 2). With the webbing 30 withdrawn from the retractor 10, the webbing is extended across a vehicle occupant (not shown). The webbing 30 is secured across the vehicle occupant in a suitable manner, such as by securing a tongue (not shown) connected to the webbing with a buckle (not shown) secured to the body of the vehicle. When the vehicle occupant is preparing to exit the vehicle, the webbing 30 is released from across the vehicle occupant. The bias of the drive assembly rotates the spool sleeve 24 (FIG. 1), the ratchet wheels 26 and the shaft 14 in the webbing retraction direction B, and the webbing 30 is coiled back onto the spool sleeve 24.

Each side 16 of the frame 12 has an opening 32. A pawl 34 extends across the frame 12 and through each of the two openings 32. An extension portion 36 of the pawl 34 projects out from the frame 12 at one side 16. The pawl 34 is pivotable between a release position (FIG. 3), in which the pawl does not engage the teeth 28 of the ratchet wheels 26, and a blocking position (FIG. 2), in which the pawl engages the teeth of the ratchet wheels. When the pawl 34 is in its release position (FIG. 3), the spool sleeve 24, the ratchet wheels 26 and the shaft 14 are rotatable together in both the webbing withdrawal and webbing retraction directions A and B.

When the pawl 34 is in its blocking position (FIG. 2), the ratchet wheels 26 are prevented from rotating in the webbing withdrawal direction A. Because they are connected to the ratchet wheels, the spool sleeve 24 and the shaft 14 cannot rotate in the webbing withdrawal direction A. The spool sleeve 24, the ratchet wheels 26 and the shaft 14 can rotate in the webbing retraction direction B, however, because the sloped surfaces of the teeth 28 cam the pawl 34 away from its blocking position as the ratchet wheels rotate.

An emergency lock-up mechanism (not shown) causes the pawl 34 to pivot to its blocking position upon the occurrence of a condition indicative of a vehicle collision. The emergency lock-up mechanism may be of any suitable design, such as an inertia mass assembly which causes the pawl 34 to pivot upon the occurrence of vehicle deceleration above a predetermined deceleration. Alternatively, the emergency lock-up mechanism may be an electro-mechanical device which causes the pawl 34 to pivot in response to an electrical signal provided by a sensor (not shown). The sensor detects a condition indicative of vehicle deceleration above a predetermined deceleration, such as occurs in a collision.

A lock-up actuator assembly 42 (FIG. 1) also causes the pawl 34 to pivot to its blocking position (FIG. 2). The actuator assembly 42 includes a protective plastic support housing 44 (FIG. 1) fixed to the one side 16 of the frame 12. The housing 44 encloses the extension portion 36 of the pawl 34. The housing 44 also encloses two support projections 38 and 40. Both projections 38 and 40 are fixed to the one side 16 of the frame 12 and extend away from the frame, parallel to the axis 20. The projection 38 is located at approximately the level of the opening 32 and is spaced away from the opening 32. The projection 40 is located beneath the opening 32.

A plastic lever 46 is enclosed within the housing 44 adjacent to the extension portion 36 of the pawl 34. The lever 46 has a hub 48 (FIG. 2) which encircles a portion of the projection 38. The lever 46 has a first arm 54, a second arm 56, and a third arm 60, which all extend radially from the hub 48.

The first arm 54 extends generally in a direction toward the axis 20 of the shaft 14. The second arm is spaced a short arc-length distance away from the first arm 54 to define a gap 58 between the first and second arms 54 and 56. The third arm 60 has a portion located beneath the extension portion 36 of the pawl 34. The third arm 60 has an arm projection 62 which extends toward the frame 12 parallel to the axis 20. The first and third arms 54 and 60 are rigid. The second arm 56 is resilient and can elastically deform.

The lever 46 is pivotable about an axis 52 of the projection 38. The axis 52 is parallel to the axis 20. Upon pivoting of the lever 46 from a first position (shown in FIG. 3) to a second position (shown in FIG. 2), the third arm 60 lifts the pawl 34 to its blocking position (shown in FIG. 2).

A metal over-center spring 64 extends between the projection 62 on the third arm 60 and the projection 40. The over-center spring 64 is stressed to provide a force which biases the projections 40 and 62 relatively away from each other. The biasing force in the over-center spring 64 increases as the distance between the projections 40 and 62 decreases.

When the lever 46 is pivoted between its first and second positions, the projection 62 is moved through a short arc which varies the distance between the projections 40 and 62. The smallest distance between the projections 40 and 62 along this arc is at a transition position (not shown) of the lever 46. The distances between the projections 40 and 62 at the first and second positions of the lever 46 are greater than the distance between the projections at the transition position.

Accordingly, during pivoting of the lever 46 from its first position to its second position, the over-center spring 64 biases the lever toward the first position until the transition position is reached. Once the transition position is reached, the over-center spring 64 biases the lever 46 towards the second position. Further, the stress in the over-center spring 64 causes the lever 46 to snap to the second position. Upon pivoting of the lever 46 from its second position to its first position, the over-center spring 64 provides a similar change of bias at the transition position. Thus, the over-center spring 64 provides a force which holds the lever 46 in either the first or second position until the lever 46 is moved against the bias of the over-center spring 64.

A gear system 66 is provided within the housing 44. The gear system 66 includes a plastic central gear member 68 which is fixed onto an extension end 70 (FIG. 1) of the shaft 14, such that the central gear member 68 is rotated with the spool sleeve 24, the ratchet wheels 26 and the shaft 14. Along its length, the central gear member 68 has a smooth external bearing hub surface 72 located adjacent to the shaft 14 and an external array of gear teeth 74 located axially farther from the shaft 14 than the hub surface 72. A smooth axial recess 76 is formed in the distal end of the central gear member 68. A smooth support pin 78 fits in and extends from the recess 76 to a boss 80 on the housing 44 to help support and align the central gear member 68 for rotation about the axis 20. The pin 78 may be fixed to either the central gear member 68 or the housing 44, or the pin 78 may be free floating.

A plastic intermediate gear member 84 (FIG. 2) is rotatably mounted on a projection 86 on the housing 44. The intermediate gear member 84 has a large diameter array of external gear teeth 88 and a coaxial small diameter array of external gear teeth 90 which are disposed on an axis offset from the axis 20. The large and small diameter arrays of gear teeth 88 and 90 are fixed relative to each other and, in the preferred embodiment, are molded together as one piece. The large diameter array of gear teeth 88 intermeshes with the array of gear teeth 74 on the central gear member 68. Thus, as the spool sleeve 24, the ratchet wheels 26 and the shaft 14 rotate, the intermediate gear member 84 is rotated, but in the opposite direction.

A control ring gear 96 is rotatably supported on the hub surface 72 (FIG. 1) of the central gear member 68 such that the ring gear 96 can rotate about the axis 20 relative to the central gear member 68. At its radially outer periphery, the ring gear 96 has an axially projecting, annular rim 98 (FIG. 2). Formed on the radially inner circumference of the rim 98 is a circular array of internal gear teeth 100. The rim 98 also defines an annular space 102 into which the small diameter array of gear teeth 90 (FIG. 1) of the intermediate gear member 84 extends. The gear teeth 90 intermesh with the internal gear teeth 100 of the ring gear 96 such that the ring gear is rotated upon rotation of the intermediate gear member 84. The central gear member 68 and the intermediate gear member 84 provide a driving connection between the ring gear 96 and the rotatable unit comprising the spool sleeve 24, the ratchet wheels 26 and the shaft 14.

A first projection 104 extends radially outward from the rim 98 of the ring gear 96. A second projection 106 also extends radially outward from the rim 98. The second projection 106 is spaced around the circumference of the ring gear 96 away from the first projection 104. The first and second projections 104 and 106 are fixed to the rim 98 and, in the preferred embodiment, are formed as one piece with the ring gear 96. During rotation of the ring gear 96, the first and second projections 104 and 106 travel around the axis 20.

Assembly of the retractor 10 includes several steps. Some assembly steps are necessarily precedent to others. However, the assembly steps may be performed in any suitable sequence, and some assembly steps may be performed simultaneously. The following steps are representative of an assembly procedure.

The rotatable unit of the spool sleeve 24, the ratchet wheels 26 and the shaft 14 is constructed, and the end of the webbing 30 is secured to the rotatable unit. The webbing 30 is coiled onto the spool sleeve 24. The rotatable unit with the webbing coiled on it is located in the frame 12. The pawl 34 is placed within the openings 32 of the frame 12. The drive assembly (not shown) is attached to the frame 12 and the end of the shaft 14.

The webbing 30 is pulled from the retractor 10 and the spool sleeve 24 is rotated in the webbing withdrawal direction A until approximately only one coil of the webbing remains on the spool sleeve. A machine fixture holds the webbing 30 in the withdrawn position. The lever 46 is mounted on the projection 38 and the over-center spring 64 is mounted on the projections 40 and 62. The lever 46 is located in its second position (shown in FIG. 2) and the pawl 34 is located in its blocking position (shown in FIG. 2). The lever 46 is held in its second position by the over-center spring 64.

The central gear member 68, with the pin 78, is attached to the shaft 14 at the extension end 70. The ring gear 96 is coaxially aligned with the axis 20 and is rotationally oriented so that the second projection 106 overlies the gap 58 between the first and second arms 54 and 56 of the lever 46. The ring gear 96 is moved axially onto the central gear member 68 and the second projection 106 is moved into the gap 58. The gap 58 provides a location at which the second projection 106 is positioned to insure that the ring gear 96 is properly positioned. The second arm 56 holds the second projection 106 in the gap 58, adjacent to the first arm 54. Accordingly, the ring gear 96 is held in the proper position during the rest of the assembly procedure.

The intermediate gear member 84 is mounted within the housing 44 on the projection 86. The housing 44 is positioned adjacent to the one side 16 of the frame 12 and is moved axially toward the one side 16. The pin 78 slides into the boss 80 as the housing 44 is moved axially toward the one side 16. The small diameter array of gear teeth 90 moves into the annular space 102 of the ring gear 96 and intermeshes with the teeth 100.

After all of the parts of the retractor 10 are assembled, the fixture which holds the webbing 30 in the withdrawn position is released to permit the webbing to be retracted and coiled onto the spool sleeve 24. As the webbing 30 is retracted, the spool sleeve 24, the ratchet wheels 26 and the shaft 14 rotate in the webbing retraction direction B. The rotation of the ratchet wheels 26 is permitted because the sloped faces of the teeth 28 cam the pawl 34 away from the blocking position. As the shaft 14 is rotated, the central gear member 68 is rotated in the webbing retraction direction B (clockwise, as viewed in FIG. 2).

The intermediate gear member 84 is rotated in the opposite direction (counter-clockwise, as viewed in FIG. 2) and the ring gear 96 is also rotated in the opposite direction (counter-clockwise, as viewed in FIG. 2) to the rotational direction of the central gear member 68. Rotation of the ring gear 96 moves the second projection 106 out of the gap 58 between the first and second arms 54 and 56 of the lever 46. This is permitted due to the resilience of the second arm 56, which deflects or bends slightly to permit the second projection 106 to move away from the first arm 54.

As the ring gear 96 continues to rotate, the first projection 104 travels (counter-clockwise, as viewed in FIG. 2) around the axis 20 toward the first arm 54 of the lever 46. When nearly all of the webbing 30 is coiled back onto the spool sleeve 24, the first projection 104 engages the first arm 54. Continued movement of the first projection 104 causes the first projection to push on the first arm 54 and causing the lever 46 to be pivoted about the axis 52 such that the lever moves toward its transition position.

Figure 3:
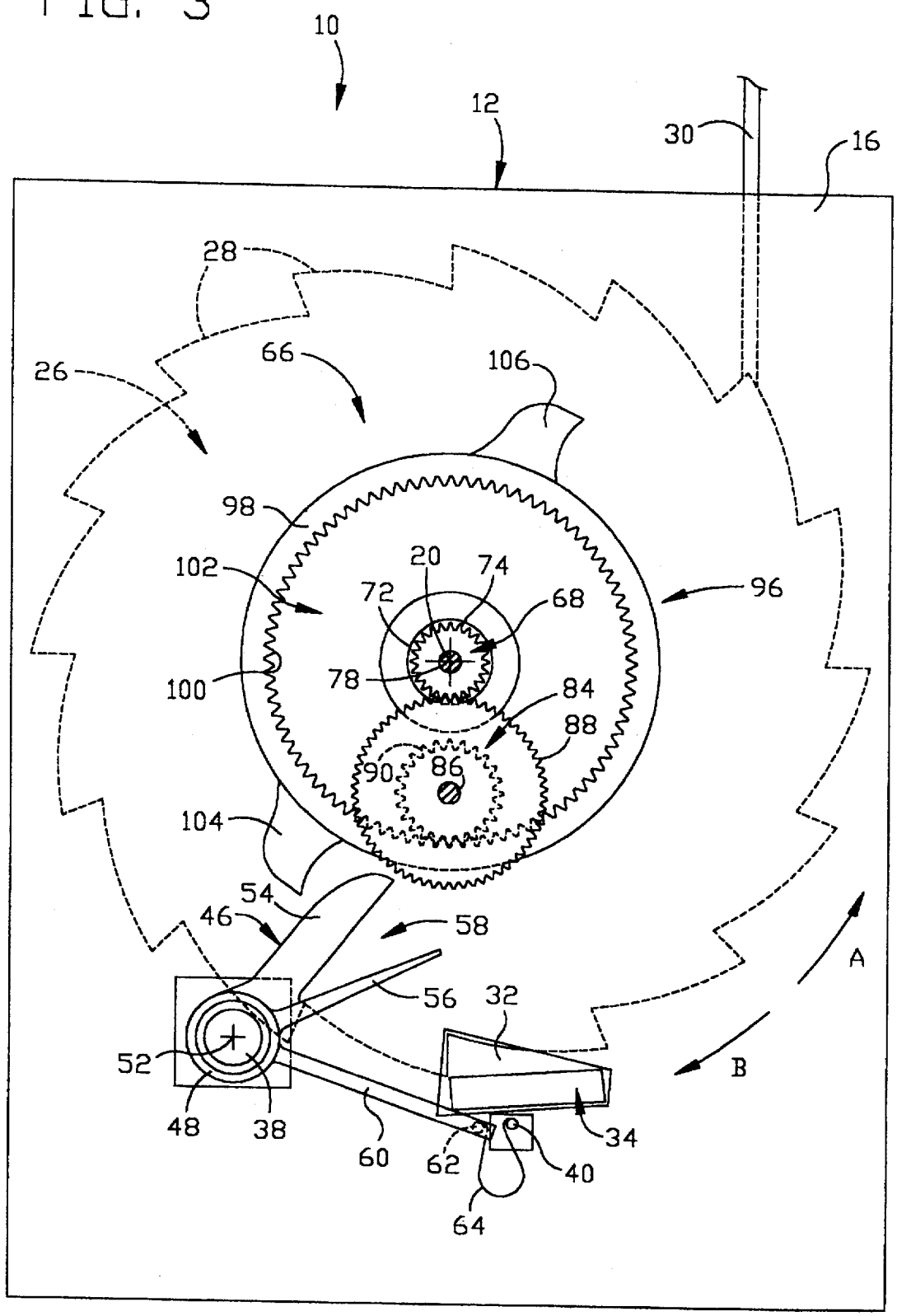
FIG. 3 is a view similar to FIG. 2 with certain parts shown in a second operational position.

As soon as the transition position of the lever 46 is reached, the over-center spring 64 snaps the lever 46 to its first position (FIG. 3). The second arm 56 moves away from the ring gear 96. The third arm 60 of the lever 46 no longer holds the pawl 34 in the blocking position and the pawl 34 is permitted to drop by gravity to its release position. The retractor 10 is now ready to be installed in a vehicle.

With the retractor 10 installed in the vehicle and most of the webbing 30 retracted and wound onto the spool sleeve 24, the parts are in the position shown in FIG. 3. During withdrawal of the webbing 30, the central gear member 68 rotates (counter-clockwise, as viewed in FIG. 3), the intermediate gear member 84 rotates in the opposite direction (clockwise), and the ring gear 96 also rotates in the direction (clockwise) opposite to that of the central gear member 68. The gearing ratios of the central gear member 68, the intermediate gear member 84 and the ring gear 96 are such that during withdrawal of a predetermined amount of the webbing 30, sufficient to extend across an occupant, child seat or object located in an associated vehicle seat, the ring gear 96 is rotated from an initial position (FIG. 3) to an end position (FIG. 2). In a preferred embodiment, the predetermined amount of the webbing 30 is most of the available length of the webbing and is associated with a rotational range of travel of the spool sleeve 24 of several revolutions. The rotational range through which the ring gear 96 moves is less than one revolution.

During the rotation of the ring gear 96, the second projection 106 travels (clockwise) about the axis 20 toward the lever 46. The second projection 106 does not engage the second arm 56 because the second arm is out of a path of travel of the second projection when the lever 46 is in its first position. The second projection 106 is moved toward the first arm 54. The second projection 106 is located on the ring gear 96 such that the second projection engages the first arm 54 and moves the lever 46 towards its second position (FIG. 2) against the bias of the over-center spring 64 when the ring gear 96 arrives at its end position. Accordingly, the ring gear 96 controls the movement of the lever 46. Once the transition position of the lever 46 is reached, the lever snaps to its second position under the bias of the over-center spring 64 and the pawl 34 is pivoted to its blocking position (FIG. 2). The pawl 34 then blocks further withdrawal of the webbing 30.

The webbing 30 may be wound back onto the spool sleeve 24 because of the sloped faces of the teeth 28 on the ratchet wheels 26, which cam the pawl 34 radially outward as each tooth passes by the pawl during rotation of the unit of the spool sleeve 24, the ratchet wheels 26 and the shaft 14 in the webbing retraction direction B. The cam action permits slack to be taken up from the fastened webbing 30 and yet a new blocking position can be established at each tooth 28. Also, the cam action permits complete retraction of the webbing 30 when the webbing is unfastened from extending around an occupant child seat, or any object.

During retraction of the webbing 30, the central gear member 68 is rotated in the webbing retraction direction B (clockwise, as viewed in FIGS. 2) and the intermediate gear member 84 and the ring gear 96 are rotated in the opposite direction (counter-clockwise). During a beginning segment of the rotational travel of the ring gear 96 from its end position (FIG. 2) toward its initial position (FIG. 3), the second projection 106 moves away from the first arm 54 and presses on the second arm 56. The second arm 56 resiliently deflects (clockwise, as viewed in FIG. 2) out of the path of travel of the second projection 106.

As the webbing 30 approaches a completely retracted position, the first projection 104 engages the first arm 54 and moves the lever 46 toward its first position (FIG. 3) against the bias of the over-center spring 64. Accordingly, the ring gear 96 controls the movement of the lever 46. Once the transition position of the lever 46 is reached, the lever snaps to its first position under the bias of the over-center spring 64. The pawl 34 can then drop away from the ratchet wheels 26 under the influence of gravity to its release position, and the retractor 10 is reset to permit a subsequent withdrawal of the webbing 30.

From the above description of the invention, those skilled in the art will perceive improvements, changes and modifications. Such improvements, changes and modifications within the skill of the art are intended to be covered by the appended claims.

Having described the invention, the following is claimed:

1. A seat belt webbing retractor comprising:
   a spool member about which seat belt webbing is wound, said spool member being rotatable in webbing withdrawal and webbing retraction directions;
   a ratchet wheel fixed for rotation with said spool member;
   movable pawl means having a blocking position for blocking said ratchet wheel and said spool member against rotation in the webbing withdrawal direction and a release position for permitting rotation of said ratchet wheel and said spool member in the webbing withdrawal direction;
   control means for moving from an initial position to an end position during rotation of said spool member and said ratchet wheel in the webbing withdrawal direction;
   lever means for moving from a first position to a second position when said control means arrives at the end position to cause movement said pawl means from the release position to the blocking position; and
   means for holding said control means in a predetermined position relative to said lever means during assembly of the retractor.

2. A retractor as set forth in claim 1, wherein said means for holding said control means includes an arm extending from said lever means for engaging said control means.

3. A retractor as set forth in claim 1, wherein said control means includes a member rotatable about an axis, said rotatable member of said control means having a portion which engages said lever means when said control means moves to the end position.

4. A retractor as set forth in claim 3, wherein said portion of said rotatable member comprises a projection, and said lever means has a first arm engaged by said projection.

5. A retractor as set forth in claim 4, wherein said means for holding said control means includes a second arm extending from said lever means, said projection of said rotatable member being located between said arms when said control means is in the predetermined position relative to said lever means.

6. A retractor as set forth in claim 5, wherein said projection has a path of travel as said rotatable member moves between the initial and end positions, said second arm being located out of the path of travel of said projection when said lever means is in the first position, said second arm being located in the path of travel of said projection when said lever means is in the second position.

7. A retractor as set forth in claim 6, wherein said second arm is resilient and deflects out of the path of travel of said projection during movement of said rotatable member from the end position toward the initial position.

8. A retractor as set forth in claim 5, wherein said lever means is pivotable about an axis parallel to the axis of rotation of said rotatable member.

9. A retractor as set forth in claim 8, further including over-center spring means for biasing said lever means into either the first or second position.

10. A retractor as set forth in claim 5, wherein said lever means includes a third arm for causing said pawl means to move to the blocking position.

11. A retractor as set forth in claim 10, wherein said second arm is located between said first and third arms.

12. A retractor as set forth in claim 5, wherein said rotatable member has a portion which engages said first arm of said lever means to move the lever means toward the first position and permit said pawl means to move to the release position when said rotatable member is moved toward the initial position.

13. A retractor as set forth in claim 1, further including a driving connection for moving said control means during rotation of said spool member and said ratchet wheel.

14. A seat belt webbing retractor comprising:
   a spool member about which seat belt webbing is wound, said spool member being rotatable in webbing withdrawal and webbing retraction directions;
   a ratchet wheel fixed for rotation with said spool member;
   a movable pawl having a blocking position blocking said ratchet wheel and said spool member against rotation in the webbing withdrawal direction and a release position permitting rotation of said ratchet wheel and said spool member in the webbing withdrawal direction;

a movable pawl control member movable from an initial position to an end position during rotation of said spool member and said ratchet wheel in the webbing withdrawal direction;

a first lever arm pivotal from a first position to a second position when said pawl control member arrives at the end position to cause movement said pawl from the release position to the blocking position; and a second lever arm to hold said pawl control member in a predetermined position relative to said first lever arm during assembly of the retractor.

15. A retractor as set forth in claim 14, wherein said pawl control member is rotatable about an axis.

16. A retractor as set forth in claim 14, wherein said pawl control member has a projection which engages said first lever arm to pivot said first lever arm.

17. A retractor as set forth in claim 16, wherein said projection being located between said two lever arms when said pawl control member is in the predetermined position.

18. A retractor as set forth in claim 16, wherein said second arm is resilient and can deflect out of a path of travel of said projection.

* * * * *